United States Patent
Hsu et al.

(10) Patent No.: US 8,010,051 B2
(45) Date of Patent: Aug. 30, 2011

(54) MULTI-PATH SIMULATION SYSTEM

(75) Inventors: Mao-Hsiu Hsu, Taipei Hsien (TW); Huan-Jin Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 544 days.

(21) Appl. No.: 12/189,801

(22) Filed: Aug. 12, 2008

(65) Prior Publication Data

US 2009/0258602 A1 Oct. 15, 2009

(30) Foreign Application Priority Data

Apr. 15, 2008 (CN) .................. 2008 2 0300563 U

(51) Int. Cl.
*H04B 17/00* (2006.01)

(52) U.S. Cl. ............... 455/67.11; 455/67.13; 455/67.14; 455/423; 455/226.1; 370/241; 370/251; 370/400; 703/13; 703/14; 324/309; 375/346; 375/350; 375/232; 375/347; 375/343; 709/212

(58) Field of Classification Search ............... 455/67.11, 455/67.13, 67.14, 423, 424, 226.1, 575.7; 370/241, 251, 400; 703/13, 14; 324/309; 375/346, 350, 232, 267, 347, 343; 709/212

See application file for complete search history.

(56) References Cited

U.S. PATENT DOCUMENTS

| | | | |
|---|---|---|---|
| 6,289,062 B1 * | 9/2001 | Wang et al. | 375/346 |
| 7,224,941 B2 * | 5/2007 | Liu | 455/67.11 |
| 2004/0228424 A1 * | 11/2004 | Baldwin et al. | 375/343 |
| 2010/0023595 A1 * | 1/2010 | McMillian et al. | 709/212 |

* cited by examiner

*Primary Examiner* — Temesgh Ghebretinsae
*Assistant Examiner* — April G Gonzales
(74) *Attorney, Agent, or Firm* — Altis Law Group, Inc.

(57) ABSTRACT

A multi-path simulation system (100) includes a signal generator (10) generating a signal, a power divider (24) connected to the signal generator for dividing the signal into N attenuated sub-signals, N delay lines (26) connected to the power divider delaying the N attenuated sub-signals to simulate the delays resulting from the transmission of the signal in the N paths, P switches (28) connected to the delay lines selecting the attenuated sub-signals delayed by the delay lines, thereby generating selected signals, and a signal combiner (29) connected to the switches combining the selected signals into a single signal. The delay lines are respectively represented by transmission lines disposed on a printed circuit board. A length of the transmission line controls a distance of transmission of the signal. Wherein N is an integer greater than one, and P is an integer equal to or greater than one.

13 Claims, 2 Drawing Sheets

MULTI-PATH SIMULATION SYSTEM

BACKGROUND

1. Field of the Invention

The invention relates to multi-path simulation, and particularly to a multi-path simulation system with a simulation circuit.

2. Description of Related Art

With recent developments in wireless communication technologies, mobile phones and wireless local area networks (WLAN) are in widespread use. In comparison to signal transmissions with a single physical path, wireless signal transmissions intrinsically utilize multiple paths, the wireless signal being transmitted to the receiving antenna via two or more paths. This can result in constructive or destructive interference, and phase offset of the signal, all of which are caused by refraction and reflection by objects such as buildings and obstacles, with correspondingly increased complexity and instability of signal transmission.

During manufacturer and development of devices utilizing the wireless transmission, signal transmission simulation is normally undertaken in conditions where testing conditions cannot be precisely controlled, it being difficult to provide reliable testing in real environments because external EMI and superfluous reflection paths cannot be avoided, with the result that overall testing result accuracy is limited.

Therefore, a heretofore unaddressed need exists in the industry to overcome the described limitations.

SUMMARY

In an exemplary embodiment, a multi-path simulation system includes a signal generator generating a signal, a power divider connected to the signal generator for dividing the signal generated by the signal generator into N attenuated sub-signals, N delay lines connected to the power divider for delaying the N attenuated sub-signals to simulate delays resulting from the transmission of the signal in the N paths, P switches connected to the delay lines for selecting the attenuated sub-signals delayed by the delay lines, thereby generating selected signals, and a signal combiner connected to the switches for combining the selected signals into a single signal. The delay lines are respectively represented by transmission lines disposed on a printed circuit board. The length of the transmission line controls a distance of transmission of the signal. N is an integer greater than one, and P is an integer equal to or greater than one.

Other advantages and novel features will become more apparent from the following detailed description of preferred embodiments when taken in conjunction with the accompanying drawings, in which:

DETAILED DESCRIPTION OF THE EMBODIMENTS

Figure 1:
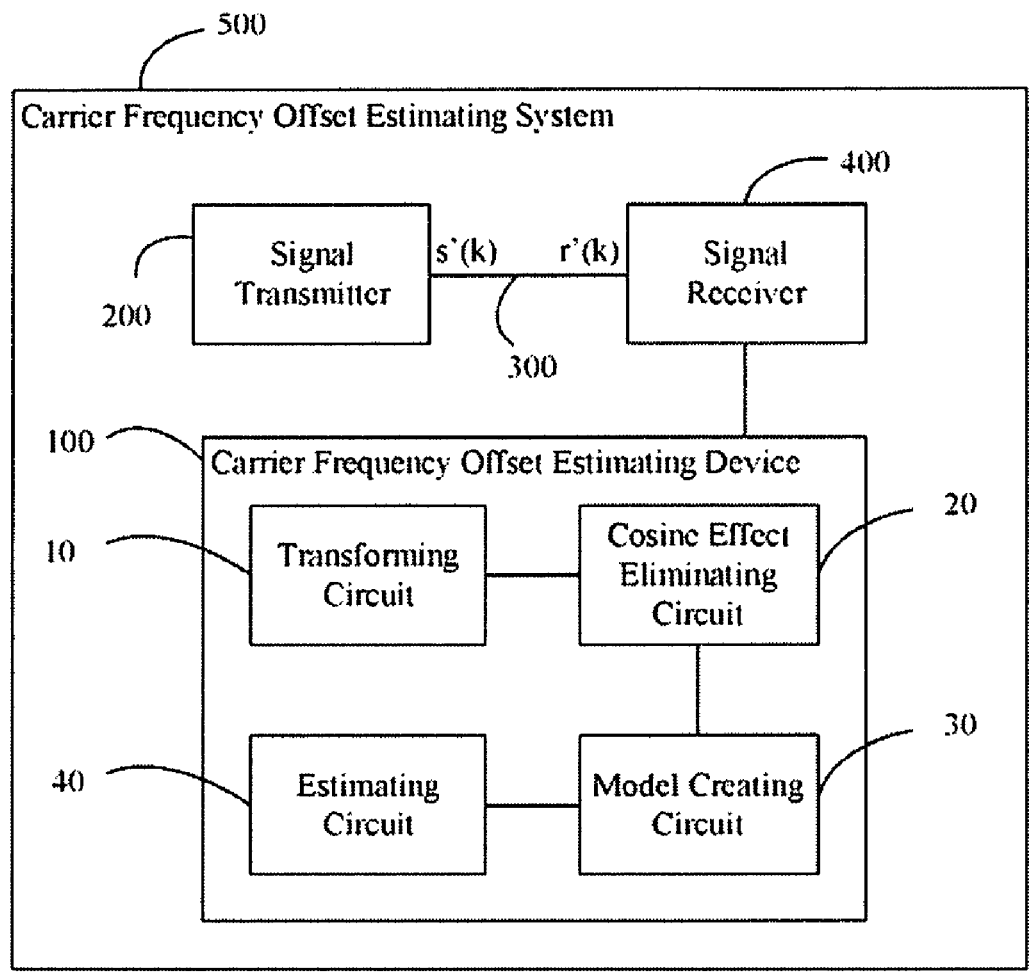
FIG. 1 is a block diagram of a multi-path simulation system of an exemplary embodiment of the present invention.

FIG. 1 is a block diagram of a multi-path simulation system 100 of an exemplary embodiment of the present invention. The multi-path simulation system 100 is used to simulate a wireless communication space with N paths. In the embodiment, N is an integer greater than one.

The multi-path simulation system 100 includes a signal generator 10 generating a signal, a signal simulating unit 20 connected to the signal generator, and a control unit 30 connected to the signal generator 10 generating the signal.

The signal simulating unit 20 divides and adjusts the signal into N simulation signals in N paths to simulate attenuations and delays resulting from the transmission of the signal in the N paths.

The signal simulating unit 20 includes an attenuator 22, a power divider 24 connected to the attenuator 22, a plurality of delay lines 26 connected to the power divider 24, a plurality of switches 28 connected to the control unit 30 and the delay lines 26, and a signal combiner 29 connected to the switches 28.

The attenuator 22 attenuates the signal generated by the signal generator 10 to simulate attenuation of the signal during transmission in a wireless communication space. Typically, amplitude of the signal attenuation increases with the distance of the signal transmission. In the embodiment, the signal attenuated by the attenuator 22 is designated as an attenuated signal. The control unit 30 is connected to the attenuator 22 to control the attenuation of the signal.

The power divider 24 divides the attenuated signal into N attenuated sub-signals. In the embodiment, there are four attenuated sub-signals.

In other embodiments, the signal-simulating unit 20 may not include the attenuator 22, in which case power divider 24 is connected directly to the signal generator 10 and divides signals generated thereby into N attenuated sub-signals.

The delay lines 26 delay the N attenuated sub-signals to simulate the delays resulting from the transmission of the signal in the N paths. In the embodiment, the delay lines 26 respectively adjust the phase of the N attenuated sub-signals to simulate phase offset resulting from the transmission of the signal in the N paths. The number of the delay lines 26 is equal to that of the attenuated sub-signals.

Figure 2:
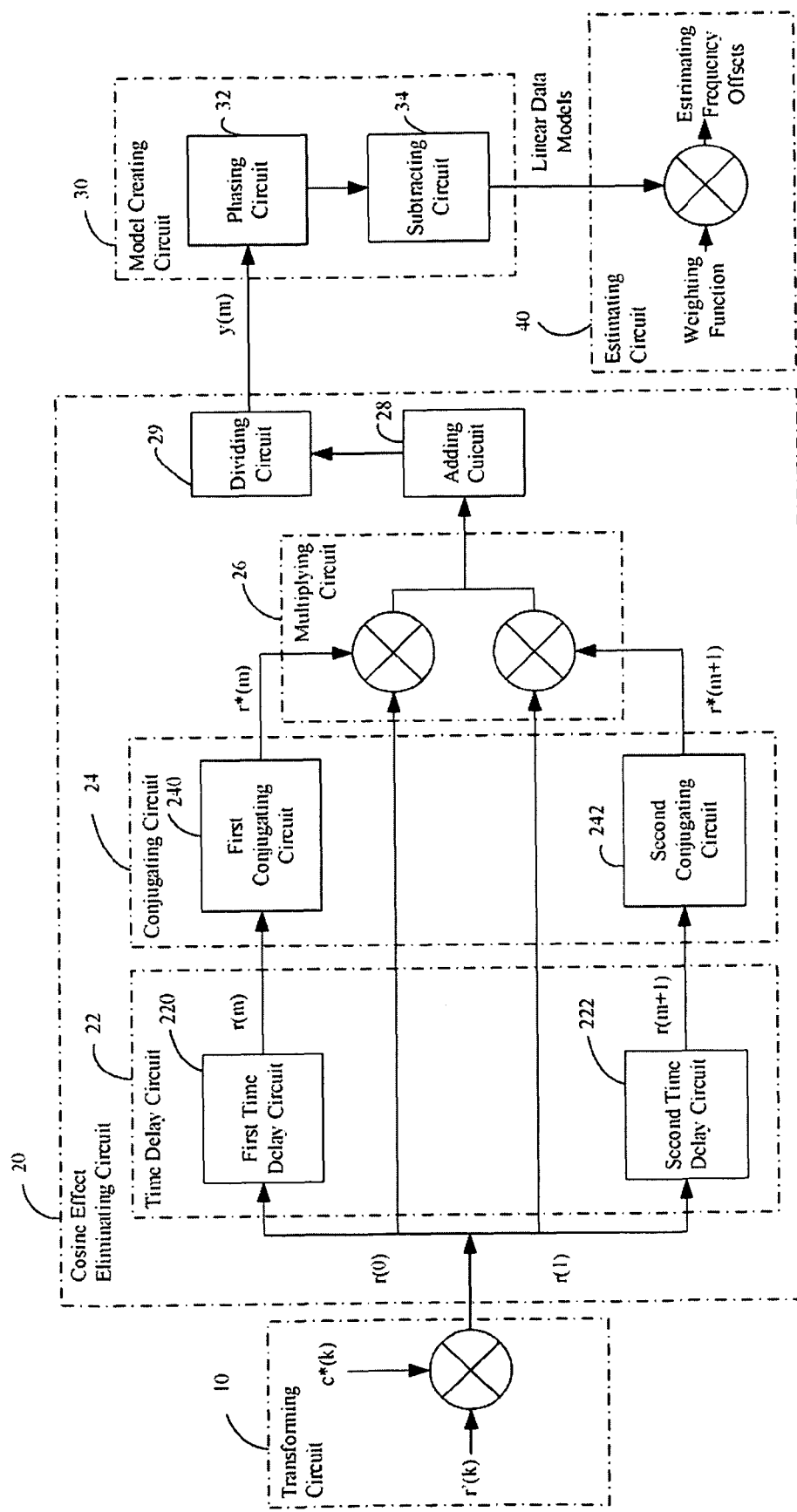
FIG. 2 is a schematic view of a simulation circuit of the multi-path simulation system of FIG. 1.

Referring also to FIG. 2, in the embodiment, the delay lines 26 are represented by transmission lines 42, 44, 46 and 48 printed on a printed circuit board 40. The phase offset of the signals during the transmission in different paths is controlled by the length of the transmission lines 42, 44, 46 or 48. For example, the transmission line 42 represents the phase of the signal with a delay of one wavelength. The transmission line 44 represents the phase of the signal with a delay of one and one-half wavelengths. The transmission line 46 represents the phase of the signal with a delay of one and one-eighth wavelengths. The transmission line 48 represents the phase of the signal with a delay of one and one-fourth wavelengths. In the embodiment, the attenuated sub-signal delayed by the delay line 26 is designated as a delayed signal.

In the embodiment, a resistor R is disposed between the two adjacent transmission lines to improve the isolation of the different signals.

The switches 28 select the delayed signals. In the embodiment, the number of the delay lines 26 is twice the number of the switches 28. For example, if the number of the delay lines 26 is four, the number of the switches 28 is two. In the embodiment, the two adjacent delay lines 26 are connected to the same switch 28, such that transmission lines 42 and 44 are connected to switch 28, as are transmission lines 46 and 48.

In other embodiments, the transmission lines 42 and 48 can be connected to the same switch 28, along with transmission lines 44 and 46; or alternatively that the transmission lines 42 and 46 can be connected to the same switch 28, as can transmission lines 44 and 48.

In the embodiment, each of the switches 28 is a logic switch controlled by the control unit 30. Each of the switches 28 only outputs signal to the signal combiner 29. In the embodiment, the signal selected by the switch 28 is designated as a selected signal.

The signal combiner 29 combines the selected signals into a single signal for output. In the embodiment, two delayed signals are selected from the four delayed signals to be combined into a single signal. In other embodiments, three or all four delayed signals can be selected for combination.

If the number of the delay lines 26 is represented as N and the number of the switches 28 is represented as P, a relationship between the number N and the number P can be expressed by the following formula:

$$P(N,2)=N!/(N-2)!*2!$$

Such that, two delay lines 26 randomly selected from the N delay lines 26 are connected to the same switch 28. For example, if the number of the delay lines 26 is four, the number of the switches 28 is six. In the embodiment, P is an integer equal to or greater than one.

In some embodiments, if the number of the delay lines 26 is four, the number of the switches 28 can be 2, 3, 4, 5, or 6. Specifically, a relation between the number N and the number P can change. Additionally, two or more delayed signals are selected from N delayed signals to be combined with the single signal.

In other embodiments, if the number of the delay lines 26 is three, the number of the switches 28 can be 1, 2, or 3.

Because delay of the signal transmission in different paths is simulated by the length of the transmission line, which controls the distance of transmission of the signal, the testing operation cannot be limited by these environments.

While embodiments of the present invention have been described above, it should be understood that they have been represented by way of example only and not by way of limitation. Thus the breadth and scope of the present invention should not be limited by the above-described exemplary embodiments, but should be defined only in accordance with the following claims and their equivalents.

What is claimed is:

1. A multi-path simulation system comprising:
   a signal generator generating a signal;
   a control unit connected to the signal generator, controlling the generation of the signal; and
   a signal simulating unit connected to the signal generator, dividing and adjusting the signal into N simulation signals in N paths to simulate attenuations and delays resulting from the transmission of the signal in the N paths, the signal simulating unit comprising;
   an attenuator, attenuating the signal generated by the signal generator to simulate the attenuation of the signal during transmission in a wireless communication space, thereby generating an attenuating signal;
   a power divider dividing the attenuated signal into N attenuated sub-signals;
   N delay lines connected to the power divider, delaying the N attenuated sub-signals to simulate the delays resulting from the transmission of the signal in the N paths, the delay lines respectively represented by transmission lines disposed on a printed circuit board, wherein length of the transmission line controls distance of transmission of the signal;
   P switches connected to the delay lines, selecting the attenuated sub-signals delayed by the delay lines, resulting in selected signals;
   a signal combiner connected to the switches combining the selected signals into a single signal; and
   a resistor R, disposed between the two adjacent transmission lines to improve isolation of the different signals;
   wherein N is an integer greater than one, and P is an integer equal to or greater than one.

2. The multi-path simulation system as claimed in claim 1, wherein each of the switches is a logic switch connected to the control unit.

3. The multi-path simulation system as claimed in claim 2, wherein N is equal to P.

4. The multi-path simulation system as claimed in claim 2, wherein P is greater than N.

5. The multi-path simulation system as claimed in claim 2, wherein P is less than N.

6. The multi-path simulation system as claimed in claim 1, wherein the delay lines respectively adjust phase of the N attenuated sub-signals to simulate phase offset resulting from the transmission of the signal in the N paths.

7. A multi-path simulation system comprising:
   a signal generator generating a signal;
   a power divider connected to the signal generator for dividing the signal generated by the signal generator into N attenuated sub-signals;
   N delay lines coupled to the power divider delaying the N attenuated sub-signals to simulate the delays resulting from the transmission of the signal in the N paths, the delay lines respectively represented by transmission lines disposed on a printed circuit board, wherein a length of the transmission line controls a distance of transmission of the signal;
   P switches connected to the delay lines selecting the attenuated sub-signals delayed by the delay lines, thereby generating selected signals; a signal combiner connected to the switches combining the selected signals into a single signal; and
   a resistor R, disposed between the two adjacent transmission lines to improve isolation of the different signals;
   wherein N is an integer greater than one, and P is an integer equal to or greater than one.

8. The multi-path simulation system as claimed in claim 7, further comprising a control unit controlling the switches and the signal generator.

9. The multi-path simulation system as claimed in claim 7, wherein each of the switches is a logic switch.

10. The multi-path simulation system as claimed in claim 9, wherein N is equal to P.

11. The multi-path simulation system as claimed in claim 9, wherein P is greater than N.

12. The multi-path simulation system as claimed in claim 9, wherein P is less than N.

13. The multi-path simulation system as claimed in claim 7, wherein the delay lines respectively adjust phase of the N attenuated sub-signals to simulate phase offset resulting from the transmission of the signal in the N paths.

* * * * *